(No Model.)

J. C. SHARP.
STUMP EXTRACTOR.

No. 575,132. Patented Jan. 12, 1897.

Fig. 1.

WITNESSES:
Jas. H. Wade
Jas. D. Tracy

INVENTOR
John C. Sharp (No Model.)  5 Sheets—Sheet 3.

J. C. SHARP.
STUMP EXTRACTOR.

No. 575,132. Patented Jan. 12, 1897.

Fig. 3.

WITNESSES: INVENTOR (No Model.) 5 Sheets—Sheet 5.

J. C. SHARP.
STUMP EXTRACTOR.

No. 575,132. Patented Jan. 12, 1897.

WITNESSES: INVENTOR

UNITED STATES PATENT OFFICE.

JOHN C. SHARP, OF DELAVAN, WISCONSIN.

STUMP-EXTRACTOR.

SPECIFICATION forming part of Letters Patent No. 575,132, dated January 12, 1897.

Application filed April 11, 1896. Serial No. 587,160½. (No model.)

*To all whom it may concern:*

Be it known that I, JOHN C. SHARP, a citizen of the United States of America, residing at Delavan, in the county of Walworth and State of Wisconsin, have invented certain new and useful Improvements in Stump-Extractors, of which the following is a specification.

The object of my invention is to provide a cheap, handy, and powerful machine for extracting stumps and trees; and my invention consists of certain details which are hereinafter described and claimed.

In the accompanying drawings, illustrating my invention, in which similar numerals and letters of reference indicate like parts.

The main frame of my machine may be made in any shape or form and of metal or such other material as may be best suited to the requirements of the case, and as shown in this instance it is composed of a bed-plate A, preferably mounted on and bolted to transverse supporting-runners 1. Said bed-plate A has a circular opening 2 in it to receive and serve as a bearing for the lower hub 3 of the drum B. The circular opening 2 may be closed at its bottom part, thus forming a cup or reservoir for containing oil for lubricating the bearing, and in said bottom part a circular groove 4 may be made as a trackway for the antifriction-balls 5, on which balls rests the lower end of the drum-hub 3. Surrounding the opening 2 in the bed-plate A is a circular channel or groove 6 for the purpose of intercepting and preventing any dirt that may work under the drum from getting into the hub-bearing 2, and the bed-plate may have strengthening and stiffening ribs 7 on its front legs. Preferably cast on the rear part of the bed-plate is an anchor-lug C, with an opening 8 to receive one of the eyes 9 of the V-shaped anchor-bail D, which eye is securely held in said opening 8 by means of a cross-pin 10, passing through an opening 11, made through both sides of the anchor-lug C. The opening 11 is elongated or made of slotted form, so as to give the cross-pin 10 horizontal-play room therein for adjusting purposes, as hereinafter explained. The anchor-lug may also have ribs or wings 12, preferably cast on the lug and bed-plate, so as to stiffen the bed-plate, as well as for tying the anchor-lug more strongly to the wide and strong part of the bed-plate, and said wings may also serve to aid in holding the draft-cable in its groove on the drum.

Figures 4, 5, 6, 7, 8, 9, 10, 16:
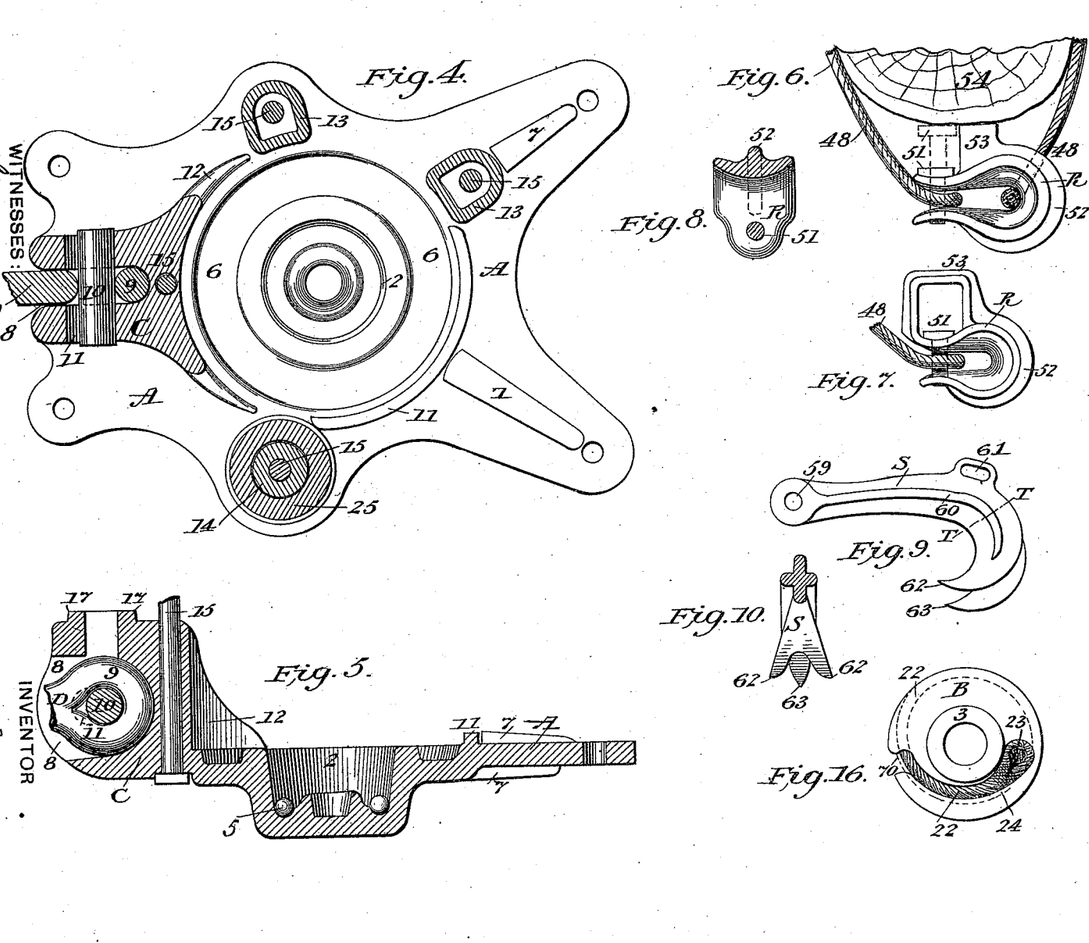
Fig. 4 is a plan view of the bed-plate of the machine, showing the pillars 13, the roller 25, bolts 15, column 14, the anchor-lug C, and a part of the anchor-bail D, all in horizontal section cut longitudinally on a horizontal line drawn through the center of the anchor-lug slotted opening 11, the anchor-bail cross-pin being shown in whole form.
Fig. 5 is a central longitudinal vertical sectional view of the bed-plate, showing the anchor-bail D and the bolt 15 partly in whole form and the antifriction-balls 5 in whole form.
Fig. 6 is a front elevation of my slip-noose clevis connected to a hitch-cable, which cable is shown in broken section partly around a section of a stump 54, said stump being shown as pulled over on its side in this view.
Fig. 7 is a front elevation of a modified form of my slip-noose clevis with a broken section of the hitch-cable attached to it.
Fig. 8 is a central horizontal cross-sectional view of the aforesaid slip-noose clevis, showing only the lower half thereof.
Fig. 9 is a side elevation of my low-stump hook.
Fig. 10 is a section of said low-stump hook, cut about on dotted line T T of Fig. 9 to show a front view of the teeth or points of said hook.
Fig. 16 is a plan view of the lower end of the drum, showing how the end of the draft-cable is connected to the drum.
Figures 11, 12:
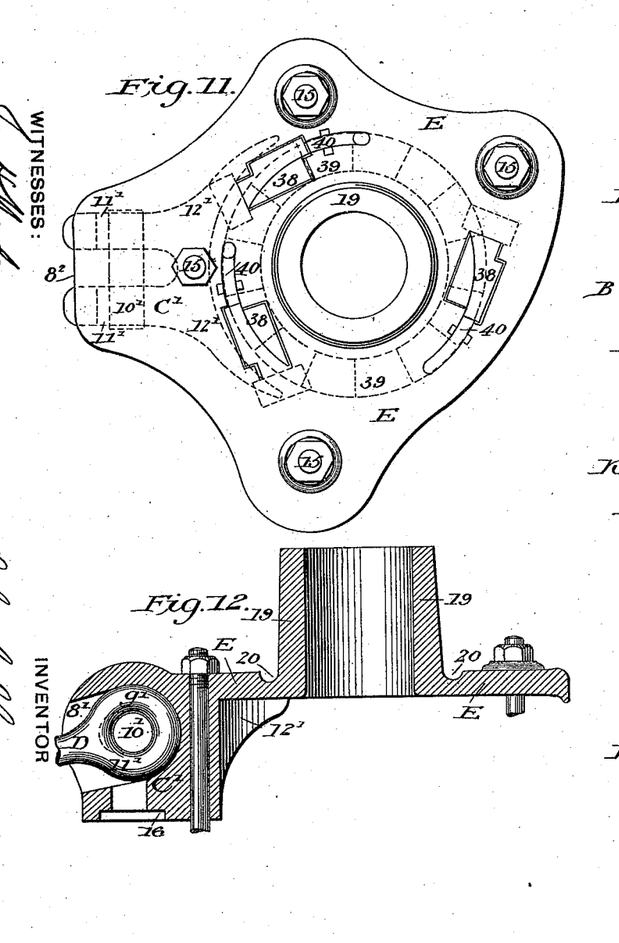
Fig. 11 is a plan view of the top plate of my machine, showing the anchor-lug, the anchor-bail cross-pin, and the teeth on the upper end of the drum in dotted lines.
Fig. 12 is a vertical section of the aforesaid top plate, cut centrally from front to rear through the anchor-lug and showing the anchor-bail cross-pin 10, a part of the anchor-bail D, and a part of each of the bolts in whole form.

Supported on hollow pillars 13, round column 14, and the anchor-lug C is the top plate E, which is secured to the bed-plate A by suitable bolts 15. The top plate may have an anchor-lug C', made with an opening 8', slotted openings 11², wings 12', all similar to those of the bed-plate anchor-lug C. Said top plate E may also have an opening 16 to receive the upwardly-projecting part 17 on the bed-plate anchor-lug C. The upper hub 18 of the drum B has its bearing in a collar 19, cast on the top plate. Surrounding said collar 19 I in some cases provide a groove 20 as a trackway for the antifriction-balls 5'. The drum B, as shown in this instance, has a groove 21, running spirally from the bottom to the top of the drum for the draft-cable 22, and the eye at one end of said draft-cable is secured by a pin 23, passing upwardly through the lower end of the drum, the cable lying in an opening 24 made therefor and passing outwardly on a curve into the spiral groove, where it begins to wind. An opening 70 is made to permit placing the draft-cable in its curved opening 24, Fig. 16, and to prevent the cable from getting down and out of the opening 70 and wedging between the drum and bed-plate when all unwound from the drum I cast an upwardly-projecting draft-cable guard 11, as shown in Figs. 4 and 5, which guard surrounds the front part of the drum and projects high enough to keep the draft-cable up in its proper place when unwound.

To guide the draft-cable 22 properly on the drum and hold it in the aforesaid spiral groove, I mount a sleeve or roller 25 on the round column 14, as shown. The pillars 13 may be made of cylindrical form, but in this case I show them flattened on the side next to the drum. These pillars not only help support the top plate, but aid in holding the draft-cable in the spiral groove of the drum, and for this latter purpose the flattened faces of the pillars afford more contact-surface for the cable than if their faces were convex or round.

The inner end of the draft-lever 26 is inserted in the rectangular part of the lever-socket casting F, and a hoop part 27 of said draft-lever socket fits over the top-plate collar 19, so as to make a pivotal connection thereto. At the top of the hoop part 27 is provided a circular row of teeth 28 to form one member of a clutch. The other clutch member 29 is splined to slide up and down on the drum-shaft and has teeth at its lower end to match and engage with the aforesaid teeth 28, so as to cause the drum to turn when thus engaged and the draft-lever operated. The clutch member 29 is lifted by the lifting device 30, which rocks on a suitable bearing on the top of the lever-socket, as shown. The lever 31 of the lifting device 30 may have attached to it a chain or connection 32, leading under a pulley 33, thence to the outer part of the draft-lever, and there suitably connected to an eccentric, which may be operated by moving its handle 34, causing the eccentric to pull on the said connection 32, and thus raise the clutch member, when desired.

The eccentric-handle 34 is pivoted to turn in a casting or frame G, bolted to the draft-lever, and over the outer end of the draft-lever I usually fit a box-shaped casting H, provided with an eye 37 to afford a convenient attaching-place for the horse or team. On the top of the upper hub of the drum I sometimes mount a hand-wheel 35, which may be secured to the hub by a feather 36, as shown, or in any simple and suitable manner, so that by turning the hand-wheel the drum is turned with it when the clutch member 28 has first been raised to thereby disconnect the drum from the draft-lever socket. The object of this hand-wheel is to enable the operator to more quickly wind up slack in the draft-cable than could be done by the draft-animals operating the draft-lever. To render the friction less, the lower end of the hoop part 27 of the draft-lever socket may rest and turn on the antifriction-balls 5', hereinbefore mentioned.

Figures 13, 14:
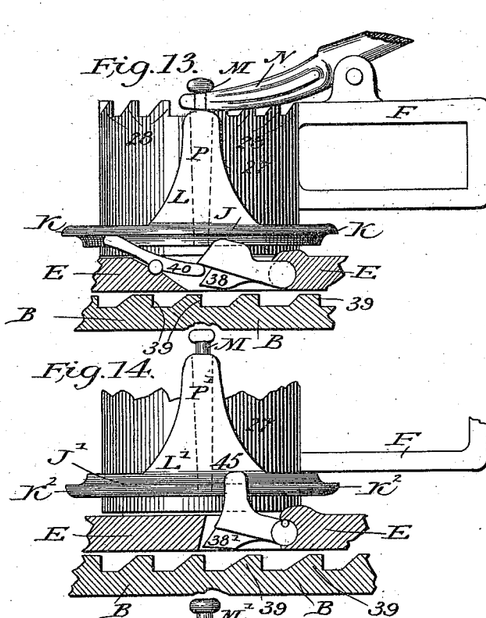
Fig. 13 is a side elevation of the draft-lever socket, the sliding ring, the ring-lifting device N, with a part of the latter broken off, also a side elevation of the pawl 38, and the pawl-lifting lever 40, and shows a vertical section of the top plate E and a vertical section of a part of drum B, the latter cut so as to show the teeth on the top part thereof.
Fig. 14 is a side elevation of a broken section of the lever-socket and also shows in side elevation a modified form of sliding ring and a pawl with a vertical section of a part of the top plate and a part of the drum, the latter cut so as to show the teeth on the top of the drum.

To prevent the drum from turning backward, I usually mount in the openings made therefor in the top plate pawls 38, as shown, to engage with teeth 39, made in a circular row on the upper end of the drum. To raise the pawls out of engagement from the said drum-teeth 39, I sometimes mount a pawl-lifting lever 40 to rock slightly in suitable bearings in the top plate and with one end of said pawl-lifting lever under a part of the pawl, as best shown in Fig. 13. To depress the pawl-lifting lever 40, I place on the hoop part 27 of the draft-lever socket a ring J, with a laterally-projecting flange K, upwardly-projecting lugs or ears L, with a neck and headed part M for attachment of the lifting device N, which is mounted to rock slightly in a bearing on the top of the draft-lever socket, as shown, and may be connected by a chain 41 and wire 42 to an operating-handle 43, attached to an eccentric and adapted to raise said sliding ring J in a similar manner to that of operating the clutch member 29, hereinbefore mentioned. The connecting-wires may have screw turnbuckles 44 for proper adjustment of the length of the wires 32 and 42, when desired. The sliding ring J may be mounted to slide on a feather or spline P, cast on the hoop part 27 of the draft-lever socket. As arranged, it will be seen that by having the ring J slide down on the top of the pawl-lifting lever 40 said lever would be depressed at that end, and its other end would then lift the pawl out of engagement with the drum-tooth 39, as shown in said Fig. 13, and when the ring is raised off the pawl-lifting lever 40 the pawl 38 would again engage with the teeth and prevent the drum from turning backward.

Figure 15:
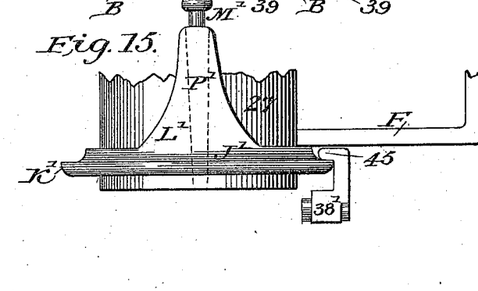
Fig. 15 is a side elevation of a part of the draft-lever socket, a side elevation of the modified sliding ring J', and an end view of the modified pawl 38' to more clearly show its operative connection with the said modified sliding ring than as shown in Fig. 14.

In some cases I may dispense with the pawl-lifting lever 40, providing a pawl 38', with a lip 45, projecting over the lateral flange K of a modified sliding ring J', as shown in Figs. 14 and 15, and thus engaged the said lip connection with the sliding ring would disengage the pawl from the drum-tooth; but this would require the operator to keep pulling the eccentric-handle 43 until the pawl is fully disengaged from the tooth, while by the first method above described he would simply have to pull the eccentric over, and the weight of the sliding ring J would, through the pawl-lifting lever's connection, lift the pawl out of the drum-tooth just as soon as the drum turns far enough to release the pawl from hard contact with said tooth.

In my former Letters Patent of the United States of America, dated March 10, 1896, and numbered 555,977, for improvements in stump-extractors, I describe and claim a cam device for depressing the pawl-lifting lever automatically when the draft-lever has reached a fixed point in its turning; but to always have to wait until the draft-lever reaches said fixed point in its turning before the pawls can be disengaged by the cam is frequently a great disadvantage and involves the loss of too much time in operating the machine when compared with my improved method, herein described and claimed, of disengaging the pawls, whereby the driver without leaving his team may at any time control the action of the pawls and without waiting for the draft-lever to reach some fixed point in its turning. The automatic disengagement of the pawls when the draft-lever reaches a fixed point I find is objectionable also because the pawls are at times disengaged from the drum-teeth too soon or before the stump has been pulled far enough and when it is desirable to still have the pawls operating.

Figure 1:
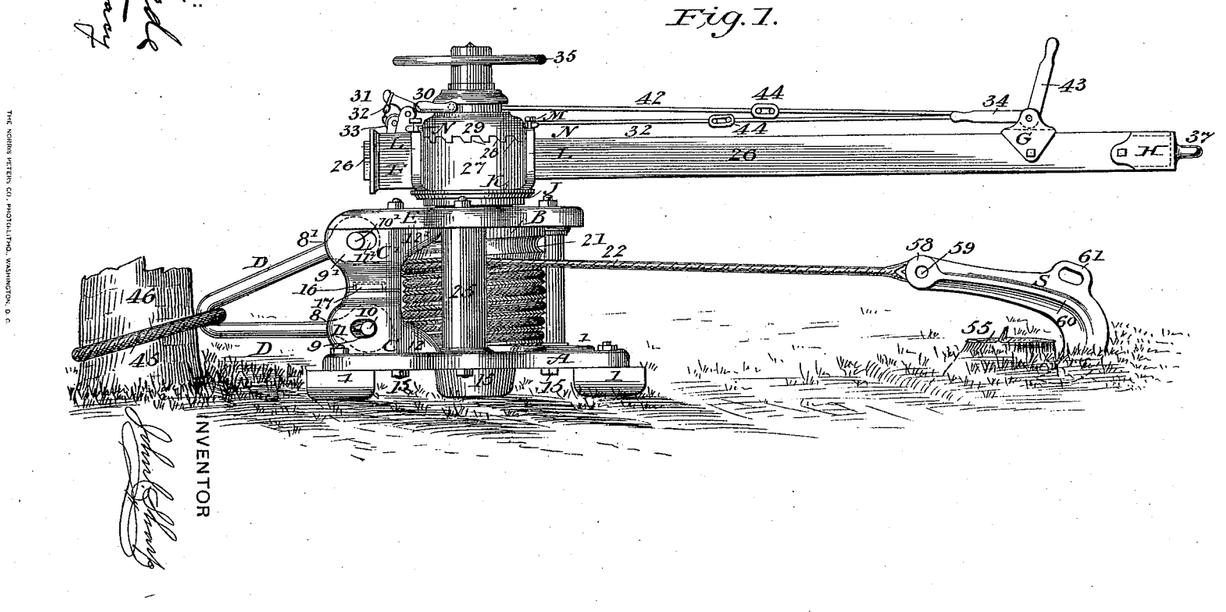
Figure 1 is a side elevation of my machine connected to an anchor-stump 46 and showing the low-stump hook S applied to a low-cut stump to pull it.

The V-shaped anchor-bail of my machine is preferably secured to the anchor-lugs C and C' by means of the cross-pins 10 and 10', placed in the slotted openings 11 and 11', as shown in the illustrations, and the reason why the openings 11 and 11' are made of elongated or in slotted form instead of being round to fit the cross-pins is to have the anchor-bail exert more of a pull on the top-plate lug C' than on the bed-plate lug C, when the draft-cable is under great strain and winding on the upper part of the drum, as shown in Fig. 1, where it will be seen that the cross-pin 10', that holds the upper part of the anchor-bail, is clear out at the end of its slotted opening and doing the heavy pulling, while the cross-pin 10 of the lower part of the anchor-bail is being pushed by the pull on the anchor-bail hard against the end of its slotted opening toward the drum, and this pulling on the top plate and pushing on the bed-plate of the main frame by the anchor-bail, it will readily be seen, serves to counteract the leverage exerted by the draft-cable when under heavy strain and winding near the top of the drum, which cable-leverage would otherwise be likely to tip the drum over forwardly into a foul pulling position. When the draft-cable is winding at the bottom of the drum, the position of the said cross-pins in the slotted openings of the anchor-lugs would be the reverse of that when the draft-cable is winding at the top of the drum, and when winding in the central part of the drum said cross-pins would bear the strain equally and both be at the outer end of their aforesaid slotted openings. This adjustable feature of the anchor-bail of my machine is a very important one in machines of this kind and renders practicable the use of a longer drum than could be successfully used with a flexible anchor device, as, for instance, a chain or a rope with its ends attached to the top and bottom parts of the main frame, or of a V-shaped rigid anchor-bail attached to the top and bottom parts of the main frame in any other manner than the method herein first above described; and by thus securing the ends of the anchor-bail in the openings made therefor in the anchor-lugs enough lateral rigidity of the anchor-bail at such connection is obtained to cause the machine to swing more promptly into line of draft or properly face the stump that is to be pulled than by the use of a laterally-flexible anchor device or a non-flexible bail or anchor device, but laterally flexibly connected to the main frame.

In operation an anchor-cable 45 is placed around the anchor-stump 46 and attached to the anchor-bail D in any simple and suitable manner. To pull a tree or high-cut stump 47, I attach a hitch-cable 48 to the link 49 of the draft-cable 22 by means of a connecting-clevis 50, and said hitch-cable passes through a slip-noose clevis R, thence around the stump 47, and the eye in the end of the hitch-cable is secured between the sides of the said slip-noose clevis by means of a cross-pin 51. The inside of the slip-noose clevis R is flared or curved outwardly from its center, as shown in the illustrations, in order to prevent short and injurious bending therein of the wire hitch-cable used, and to avoid short bending of said cable near the cross-pin 51, when the stump has been pulled over on its side, that end of the clevis is also flared outwardly from the cross-pin hole, so the hitch-cable may lead on a curve from the cross-pin 51 around the stump, as shown in Fig. 6. Around the outside of the slip-noose clevis R, I provide a central rib 52 for strengthening it. In some cases the rib 52 may be widened out, so as to form a cross-pin guard 53, the object being to have the stump 54, when pulled over on its side, as shown in Fig. 6, rest on the guard 53, so the cross-pin 51 may be freely raised, as shown in the dotted lines, and the hitch-cable removed from the slip-noose clevis, when desired, as with the hitch-cable removed it is then easier to get the slip-noose clevis out from under the large stump. In Fig. 7 a modified form of cross-pin guard is shown as bridging over the top of the cross-pin with sufficient space below to permit raising the cross-pin. Without the said guard the stump would be likely to pull over on the head of the cross-pin and thus interfere with raising it.

Figure 2:
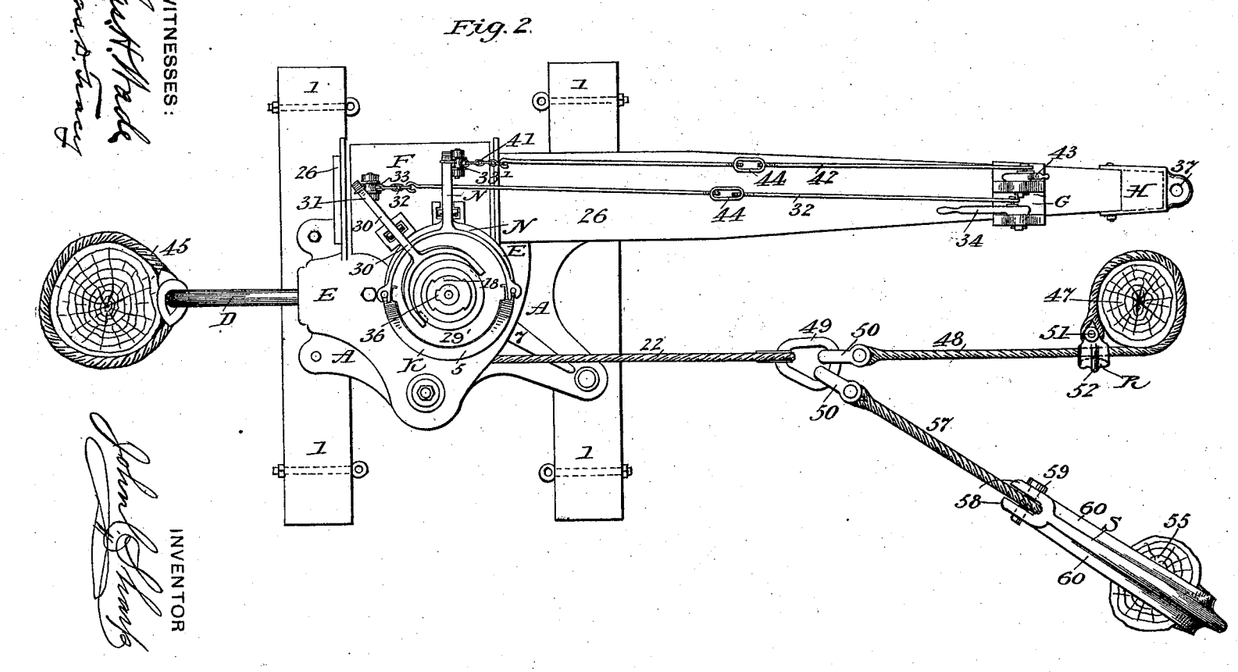
Fig. 2 is a plan view of the machine anchored to a stump 46 and showing the hand-wheel removed and the low-stump hook applied to a low-cut stump to pull it and a hitch-cable attached to a higher-cut stump and with one of my slip-noose clevises in use on said hitch-cable.
Figure 3:
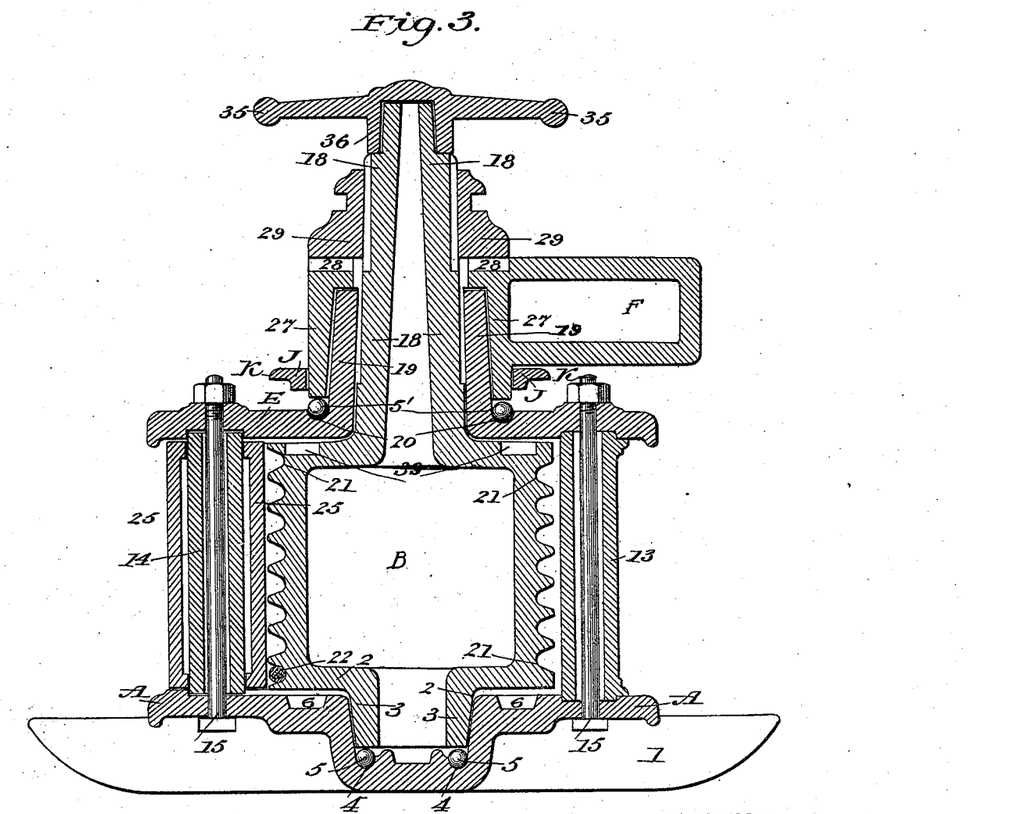
Fig. 3 is a vertical sectional view of my machine, cut a little back of the center, showing the bolts and antifriction-balls in whole form, but not showing the parts on top of the rectangular or box-shaped portion of the lever-socket that are shown in Figs. 1 and 2.

For stumps that have been cut off too low or too short, so that a slip-noose hitch on them with the hitch-cable would not hold to pull them, I provide a large strong low-stump hook S, with its points set at the back of the low-cut stump 55, and a cable 57 or 22, placed between the jaws 58 of the hook and secured by the cross-pin 59, passing through the hook-jaws and the eye at the end of the cable, as shown in Figs. 1 and 2. To stiffen and strengthen this low-stump hook laterally, I cast ribs 60 on its sides, and sometimes cast a handle 61 on the hook for convenience in handling it. Heretofore low-stump hooks have been made with a number of teeth or points, but all located on the same horizontal plane. In my improved low-stump hook it will be seen that the two points 62 are on one plane, while the central point 63 is on another and lower horizontal plane, as best shown in Figs. 9 and 10. If the points or teeth are all placed on the hook in the same plane, when the stump turns over in the pulling the teeth or points of the hook are likely to come out and plow up along the back of the stump, and the hook frequently comes off before the pulls are finished; but in my improved low-stump hook the teeth or points 62 first cut into the wood of the stump, and as the stump yields and turns over on its side and the teeth or points 62 tend to let go the point or tooth 63 then usually engages and holds to the stump until it is entirely free or out of the ground.

Aside from the working of the special features of my machine, which are hereinbefore explained, the machine is anchored and operated in a manner similar to other machines of this class. Primarily the machine is intended for extracting stumps and trees, but may also be used for removing buildings, logs, or any other heavy bodies to which a powerful pulling machine would be adapted. For obtaining still greater power I may of course add to the machine such simple and suitable gears as may be required to accomplish the purpose.

While I have shown and described the preferred form of my machine, I do not wish to be limited thereto, as many modifications thereof could be made without departing from the spirit of my invention.

What I claim as my invention is—

1. In a stump-extractor, the combination of a main frame with a winding-drum mounted to rotate therein, a draft-cable attached to the drum, suitable mechanism for rotating said drum, an anchor-bail with an eye formed at each of its ends, said eye ends projecting into openings in anchor-lugs made on the upper and lower parts of the main frame, cross-pins in the anchor-bail eyes and the ends of said cross-pins secured in slotted openings made therefor, in the sides of said anchor-lugs, said slotted openings being of sufficient length to give the cross-pins horizontal-play room therein to enable the anchor-bail to automatically adjust itself to the changing draft of the cable when it is winding at different heights on the drum, all substantially as shown and described and for the purpose set forth.

2. In a stump-extractor, the combination of a main frame with a winding-drum mounted to rotate therein, a draft-cable attached to the drum, suitable mechanism for rotating said drum, an anchor-lug made on the bed-plate part of said main frame with means of attachment for an anchor-bail or anchor device to said anchor-lug, a rib or wing part suitably secured to the anchor-lug and bed-plate and said rib projecting outwardly and forwardly from said anchor-lug partly around the drum, for the purpose of strongly tying or securing the anchor-lug to the wide and strong part of the bed-plate of the main frame, and also for stiffening said bed-plate, all substantially as shown and described and for the purpose set forth.

3. In a stump-extractor, the combination of a main frame with a winding-drum mounted to rotate therein, a draft-cable attached to the drum, suitable mechanism for rotating the drum, an anchor-lug made on the bed-plate part of said main frame with a rib or wing part suitably secured to said anchor-lug and bed-plate, and said rib or wing part projecting outwardly and forwardly from the anchor-lug partly around the drum, for the purpose of strongly tying or securing said anchor-lug to the wide and strong part of the bed-plate of the main frame and also for stiffening said bed-plate, an anchor-bail or anchor device with an eye formed at its end and said eye end projecting into an opening made in the anchor-lug therefor, a cross-pin in the eye of said anchor device and the outer ends of said cross-pin secured in a slotted opening made in the sides of said anchor-lug and said slotted opening being of sufficient length to give said cross-pin horizontal-play room therein for adjusting purposes, all substantially as shown and described.

4. In a stump-extractor, the combination of a main frame with a winding-drum mounted to rotate therein, a draft-cable attached to the drum, suitable mechanism for rotating said drum, an anchor-lug made on the top-plate part of said main frame with a rib or wing part suitably secured to said anchor-lug and top plate, and said rib or wing part projecting outwardly and forwardly from the anchor-lug partly around the drum, for the purpose of strongly tying or securing said anchor-lug to the wide and strong part of the top plate of the main frame and also for stiffening said top plate, an anchor-bail or anchor device with an eye formed at its end and said eye end projecting into an opening made in the anchor-lug therefor, a cross-pin in the eye of said anchor device and the outer ends of said cross-pin secured in a slotted opening made therefor in the sides of the anchor-lug, and said slotted opening being of sufficient length to give said cross-pin horizontal-play room therein for adjusting purposes, all substantially as shown and described.

5. In a stump-extractor, the combination of a main frame with a winding-drum mounted to rotate therein, a draft-cable attached to the drum, suitable mechanism for rotating said drum, an anchor-bail or anchor device with an eye formed at its end, said eye end projecting into an opening in an anchor-lug made on the bed-plate part of said main frame, a cross-pin in the eye of the anchor-bail or anchor device, the ends of said cross-pin secured in a slotted opening made therefor in the sides of the anchor-lug and said slotted opening being of sufficient length to give said cross-pin horizontal-play room therein to enable the anchor-bail to automatically adjust itself to the changing draft of the draft-cable when it is winding at different heights on the drum, all substantially as shown and described and for the purpose set forth.

6. In a stump-extractor, the combination of a main frame with a winding-drum mounted to rotate therein, a draft-cable attached to the drum, suitable mechanism for rotating said drum, an anchor-bail or anchor device with an eye formed at its end, said eye end projecting into an opening in an anchor-lug made on the top-plate part of said main frame, a cross-pin in said eye of the anchor-bail or anchor device, the ends of said cross-pin secured in a slotted opening made therefor in the sides of the anchor-lug and said slotted opening being made of a sufficient length to give said cross-pin horizontal-play room to enable said anchor-bail to automatically adjust itself to the changing draft of the draft-cable when it is winding at different heights on the drum, all substantially as shown and described and for the purpose set forth.

7. In a stump-extractor, the combination of a main frame with a winding-drum mounted to rotate therein, a draft-cable attached to the drum, suitable mechanism for rotating said drum, a roller mounted parallel to the drum between the bed-plate and top-plate parts of said main frame for guiding and holding the draft-cable on the drum, an anchor-bail with an eye formed at both of its ends, said eye ends projecting into openings in anchor-lugs made on said bed-plate and top plate, cross-pins in the eyes of the anchor-bail, and the ends of said cross-pins secured in slotted openings made therefor in the sides of the anchor-lugs, the slotted openings being made of sufficient length to give said cross-pins horizontal-play room to enable the anchor-bail to automatically adjust itself to the changing draft of the cable when it is winding at different heights on the drum, all substantially as shown and described and for the purpose set forth.

8. In a stump-extractor, the combination of a main frame with a winding-drum mounted to rotate therein, a draft-cable attached to the drum, suitable mechanism for rotating said drum, an anchor-bail with an eye formed at each of its ends, said eye ends projecting into openings in anchor-lugs made on the bed-plate and top-plate parts of said main frame, cross-pins in said anchor-bail eyes, the ends of said cross-pins secured in openings made therefor in the side pieces of the anchor-lugs, a rib or wing part suitably secured to the anchor-lug that is on the bed-plate and said rib or wing part also secured to the bed-plate and projecting outwardly and forwardly from said anchor-lug partly around the drum, for the purpose of strongly tying or securing said anchor-lug to the wide and strong part of the bed-plate as well as for stiffening said bed-plate there being a groove or channel in the bed-plate adjacent to and surrounding the bearing of the lower hub of the drum for the purpose of intercepting and preventing dirt from getting into said hub-bearing, all substantially as described and shown.

9. In a stump-extractor, the combination of a main frame with a winding-drum mounted to rotate therein, a draft-cable attached to the drum, mechanism for rotating said drum, an anchor-lug on the bed-plate part of said main frame, with suitable openings made in said anchor-lug for attachment of an anchor-bail, said anchor-lug also having a wing or rib part suitably secured to it and to the bed-plate, said rib or wing projecting outwardly and forwardly partly around the drum for the purpose of tying said anchor-lug strongly to the wide and strong part of the bed-plate, there being a groove or channel made in the bed-plate adjacent to and surrounding the bearing of the lower hub of the drum to intercept dirt and prevent it from getting into said hub-bearing, all substantially as shown and described and for the purpose set forth.

10. In a stump-extractor, the combination of a main frame with a winding-drum mounted to rotate therein, a draft-cable attached to the drum, mechanism for rotating said drum, a circular row of teeth on the upper end of the drum, a pawl mounted on the top plate of said main frame and adapted to engage with the drum-teeth, a ring mounted on a rotating part of said machine and adapted to slide thereon, and said sliding ring suitably connected to said pawl so as to lift the pawl out of engagement with the drum-teeth when desired, by sliding said ring on its bearing, and suitable mechanism for causing the ring to slide, all substantially as shown and described and for the purpose set forth.

11. In a stump-extractor, the combination of a main frame with a winding-drum mounted to rotate therein, a draft-cable attached to the drum, mechanism for rotating said drum, a circular row of teeth on the top part of the drum, a pawl mounted on the top-plate part of said main frame, and adapted to engage with the drum-teeth, a ring with a laterally-projecting flange on it, said ring mounted to slide on a rotating part of the machine, the lateral flange on said sliding ring suitably connected to said pawl so as to lift it out of engagement with the drum-teeth when desired, by sliding said ring, and suitable mechanism for causing said ring to slide, all substantially as shown and described and for the purpose set forth.

12. In a stump-extractor, the combination of a main frame with a winding-drum mounted to rotate therein, a draft-cable attached to the drum, a circular row of teeth on the top part of said drum, a pawl mounted on the top-plate part of said main frame and adapted to engage with the teeth on the drum, a draft-lever socket suitably connected to the drum to rotate it, a hoop part made on the draft-lever socket, a ring mounted to slide on said draft-lever socket-hoop, said sliding ring suitably connected to said pawl so as to lift it out of engagement with the drum-teeth when desired, by sliding the ring, and suitable mechanism for causing said ring to slide, all substantially as shown and described and for the purpose set forth.

13. In a stump-extractor, the combination of a main frame with a winding-drum mounted to rotate therein, a draft-cable attached to the drum, a circular row of teeth on the upper part of the drum, a pawl mounted on the top-plate part of said main frame, and adapted to engage with the drum-teeth, a draft-lever socket suitably connected to said drum to rotate it, a hoop part made on the draft-lever socket, a ring with a laterally-projecting flange mounted to slide on said hoop part of the lever-socket, said lateral flange of the sliding ring suitably connected to the pawl so as to lift it out of engagement with the drum-teeth when desired, by sliding the ring, and suitable mechanism for causing said ring to slide, all substantially as shown and described and for the purpose set forth.

14. In a stump-extractor, the combination of a main frame with a winding-drum mounted to rotate therein, a draft-cable attached to the drum, a vertical roller mounted in said main frame parallel to the face of the drum for guiding and holding the cable on the drum, a circular row of teeth on the top part of said drum, a pawl on the top-plate part of the main frame adapted to engage with said drum-teeth, a draft-lever socket suitably connected to the drum to rotate it, a hoop part made on the draft-lever socket, a ring mounted to slide on said hoop part, the sliding ring suitably connected to said pawl so as to lift it out of engagement with the drum-teeth when desired, by sliding the ring, and mechanism for causing said ring to slide, all substantially as shown and described and for the purpose set forth.

15. In a stump-extractor, the combination of a main frame with a winding-drum mounted to rotate therein, a draft-cable attached to the drum, a vertical roller mounted in said main frame parallel to the face of the drum for guiding and holding the draft-cable on the drum, a circular row of teeth on the top part of said drum, a pawl on the top-plate part of said main frame adapted to engage with said drum-teeth, a draft-lever socket suitably connected to the drum to rotate it, a hoop part made on the draft-lever socket, a ring with a laterally-projecting flange, mounted to slide on said hoop part of the draft-lever socket, the laterally-projecting flange of said sliding ring suitably connected to said pawl so as to lift it out of engagement with the drum-teeth when desired, by sliding the ring, and suitable mechanism for causing said ring to slide, all substantially as shown and described, and for the purposes set forth.

16. In a stump-extractor, the combination of a main frame with a winding-drum mounted to rotate therein, a draft-cable attached to the drum, a hand-wheel suitably connected to the drum for winding up slack in the draft-cable by hand, a draft-lever for rotating the drum to wind up the cable and pull the load, a circular row of teeth on the top part of the drum, a pawl on the top-plate part of the main frame, adapted to engage with said drum-teeth, a ring mounted to slide on a rotating part of the machine, and said ring suitably connected to said pawl so as to lift it out of engagement with the drum-teeth by sliding the ring, and mechanism for sliding said ring, all substantially as shown and described and for the purpose set forth.

17. In a stump-extractor, the combination of a main frame with a winding-drum mounted to rotate therein, a draft-cable attached to the drum, a hand-wheel suitably connected to the drum for winding up slack in the draft-cable by hand, a circular row of teeth on the top part of the drum, a pawl on the top-plate part of the main frame adapted to engage with said drum-teeth, a draft-lever socket suitably connected to the drum to rotate it when pulling the load, a hoop part made on the draft-lever socket, a sliding ring on said hoop part, said sliding ring suitably connected to the pawl to lift it out of engagement with the drum-teeth when desired, by sliding the ring, and mechanism for causing said ring to slide, all substantially as shown and described and for the purpose set forth.

18. In a stump-extractor, the combination of a main frame with a winding-drum mounted to rotate therein, a draft-cable attached to the drum, a hand-wheel suitably connected to the drum to rotate it for winding up slack in the draft-cable by hand, a circular row of teeth on the upper end of the drum, a pawl on the top-plate part of said main frame adapted to engage with said drum-teeth, a draft-lever socket suitably connected to the drum to rotate it when pulling the load, a hoop part made on the draft-lever socket, a ring with a laterally-projecting flange mounted to slide on said hoop part of the draft-lever socket, and said laterally-projecting flange of the ring suitably connected to the pawl to lift it out of engagement with the drum-teeth when desired by sliding the ring, and mechanism for causing said ring to slide, all substantially as shown and described and for the purpose set forth.

19. In a stump-extractor, the combination of a main frame with a winding-drum mounted to rotate therein, a draft-cable attached to the drum, a hand-wheel suitably connected to the drum for winding up slack in the draft-cable by hand, a circular row of teeth on the upper end of the drum, a pawl on the top-plate part of the main frame adapted to engage with said drum-teeth, a draft-lever socket connected to the drum to rotate it when pulling the load, a hoop part made on said draft-lever socket, a sliding ring mounted on said hoop part and suitably connected with a pawl-lifting lever seated to rock on the top plate, and said pawl-lifting lever adapted to engage with and lift said pawl out of engagement with the drum-teeth when desired, by sliding the said ring, and mechanism for causing said ring to slide, all substantially as shown and described and for the purpose set forth.

20. In a stump-extractor, the combination of a main frame with a winding-drum mounted to rotate therein, a draft-cable attached to the drum, a hand-wheel suitably connected to the drum for winding up slack in the draft-cable by hand, a circular row of teeth on the upper end of the drum, a pawl on the top-plate part of said main frame adapted to engage with said drum-teeth, a draft-lever socket suitably connected to the drum to rotate it when pulling a stump or load, a hoop part made on said draft-lever socket, a ring mounted to slide on said hoop part, ears or lugs on said sliding ring, a lifting device fulcrumed on the lever-socket and connected to said lugs or ears for raising or sliding said ring, and said sliding ring suitably connected to the pawl to lift the same out of engagement with the drum-teeth when desired, all substantially as shown and described and for the purpose set forth.

21. In a stump-extractor, the combination of a main frame with a winding-drum mounted to rotate therein, a draft-cable attached to the drum, a draft-lever socket with a hoop part on it, said hoop part surrounding the upper hub of the drum, and the lower end of said hoop part resting upon antifriction-balls, which balls run in a circular groove made therefor in the top-plate part of said main frame, and mechanism for connecting said draft-lever socket to the drum to rotate the same, all substantially as shown and described and for the purpose set forth.

22. In a stump-extractor, the combination of a main frame with a winding-drum mounted to rotate therein, a draft-cable attached to the drum, mechanism for rotating said drum, there being an opening 70 in the lower end of the drum to receive the draft-cable, there being a rib or draft-cable guard 11 made on the bed-plate part of said main frame, all substantially as shown and described and for the purpose set forth.

23. The combination with the draft-cable of a stump-extractor, of a slip-noose clevis with an eye or opening in each of its sides to receive the cross-pin used for connecting the clevis to the draft-cable, the inner sides of said clevis curved or flared outwardly from their center, to prevent short bending and injury to the cable, and of a central longitudinally-disposed rib cast on the sides and around the closed end of said clevis and projecting outwardly therefrom, all substantially as shown and described and for the purpose set forth.

24. The combination with the draft-cable of a stump-extractor, of the low-stump hook with teeth or points to engage with a low stump, and its central tooth or point set on a different horizontal plane from the others, all substantially as shown and described and for the purpose set forth.

JOHN C. SHARP.

Witnesses:
JAS. H. WADE,
JAS. D. TRACY.